United States Patent Office 3,803,098
Patented Apr. 9, 1974

3,803,098
HYDROLYSIS-RESISTANT POLYURETHANE COATINGS
Karl Schmitt and Josef Disteldorf, Herne, and Gunter Kriebel and Felix Schmitt, Wanne-Eickel, Germany, assignors to Veba-Chemie AG, Gelsenkirchen-Buer, Germany
No Drawing. Filed Aug. 30, 1971, Ser. No. 176,250
Claims priority, application Germany, Sept. 2, 1970, P 20 43 493.9
Int. Cl. C08g 22/06, 22/10, 22/18
U.S. Cl. 260—75 NK                                      8 Claims

ABSTRACT OF THE DISCLOSURE

Hydrolysis-resistant polyurethane coating comprising the reaction product of
(a) a polyisocyanate, or mixtures thereof; with
(b) hydroxyl-group containing polyesters of
 (1) terephthalic acid; and
 (2) a polyol, or mixtures of polyols, comprising at least 50 mol-percent 2,2,4- or 2,4,4-trimethyl-cyclohexanediol-(1,6) or mixtures thereof,
the balance of said polyols being other diols or triols are provided.

---

This invention relates to novel hydrolysis-resistant polyurethane coatings of special composition and to a method of manufacturing same.

It is known that varnishes having good properties can be prepared by the poly-addition process through the combination of polyfunctional isocyanates with polyesters containing two or more hydroxyl groups in the molecule. The resulting polyurethane varnishes are characterized as a rule by great elasticity coupled with outstanding hardness and wear resistance, and by their good resistance to chemicals.

The polyesters containing hydroxyl groups, which are used in the creation of such polyurethane systems, are prepared by the esterification of dicarboxylic acids with an excess of bivalent or higher-valency alcohols. Generally, however, esters are not a hydrolysis-resistant class of compounds, so that they bring into the varnish system a certain sensitivity to hydrolyzing influences. If such polyurethane varnishes are exposed to the action of boiling water, the film is often destroyed within only a few hours. This disadvantage can be offset to a certain degree by using polyether glycols instead of polyesters containing hydroxyl groups. Polyurethanes on a basis of polyethers, however, do not offer good resistance to weathering. Polyethers are not used in varnishes to any appreciable extent owing to their poor resistance to oxidation.

The deficient hydrolysis resistance of polyurethane varnishes can be compensated by the use of relatively short-chained diols and triols instead of the polyesters containing hydroxyl groups, but the quality of the polyurethane varnishes formed in this manner is not good. A better approach is represented by systems in which dimeric and/or trimeric fatty alcohols with an average content of 36 and 54 carbon atoms, respectively, are used as hydroxyl components. The adhesion of such systems to metals, however, is poor and can be improved to a sufficient degree only by applying a number of coats of the varnish.

Also known is a group of polyester systems containing hydroxyl groups prepared on a basis of terephthalic acid and various diols and triols. These systems are used primarily in wire insulation. The relatively strongly colored products, however, have the disadvantage that they are very poorly soluble in esters, ketones and aromatics— that is, in the solvents commonly used with varnishes. Cresols dissolve these polyesters up to a concentration of about 50%, but the shelf life of these highly concentrated solutions is often greatly limited. If such resin solutions are used in combination with polyisocyanates as heat-hardening polyurethane varnish systems, varnishes are obtained which are greatly discolored, but which are distinguished by a relatively good resistance to hydrolysis and adequate adhesion to steel. However, due to the discoloration, poor solubility and the hazard of phenolic solvent vapors, these systems do not represent a satisfactory solution.

None of the known combinations possesses, to the desired extent, good adhesion, resistance to hydrolysis and solubility in the solvents commonly used in the varnish industry, in addition to the required mechanical characteristics.

It has now been found that hydrolysis-resistant polyurethane coatings with good mechanical properties and industrial usefulness are obtained in accordance with the present invention.

The polyurethane varnishes of this invention comprise products of polyisocyanates, preferably on the basis of 3-isocyanatomethyl-3,5,5-trimethylcyclohexylisocyanate, and polyesters containing hydroxyl groups prepared from terephthalic acid and a diol, or mixtures of diols and triols, at least 50 mol percent of which is constituted by 2,2,4- or 2,4,4-trimethylhexanediol-(1,6) or mixtures thereof. Thus, the polyol component must contain the mentioned diol(s) and may contain other diols and/or triols up to 50 mole-percent of the total polyol content.

The process for the preparation of these products from polyisocyanates and compounds containing hydroxyl groups by known methods is especially characterized by the fact that polyesters prepared from terephthalic acid and 2,4,4- or 2,4,4-trimethylhexanediol-(1,6) or mixtures thereof are used as the compounds containing hydroxyl groups, the diol component of the polyester being replaceable up to 50 mole-percent by other diols and/or triols. These polyesters containing hydroxyl groups can be prepared in a known, conventional manner. There are two processes available for the purpose.

In the first process the starting product is terephthalic acid that is free of mineral acid and which must be refined in some cases by recrystallization. The ratio of acid equivalents to alcohol is governed, of course, by the desired molecule size and by the OH number that is to be established. After the addition of 0.005 to 0.5 wt.-percent, preferably 0.05 to 0.2 wt.-percent, of a catalyst, e.g., tin compounds such as di-n-butyltin oxide, di-n-butyltin diester etc., or titanium esters, especially tetraisopropyltitanate, the reaction components are placed in a suitable apparatus and heated while an inert gas, such as nitrogen, is passed through the mixture. The first yielding of water takes place at about 180° C., the water being removed from the reaction mixture by distillation. After several hours the reaction temperaure is raised to 240° C. The reaction medium remains unhomogeneous until shortly before the end of complete esterification. After about 24 hours the reaction has ended.

In the second process the starting product is terephthalic acid dimethyl ester and it is re-esterified with the desired alcohol components while an inert gas such as nitrogen is passed through it. The re-esterification catalysts can again be titanium esters, dialkyl tin esters or di-n-butyltin oxide in concentrations of 0.005 to 0.5 wt.-percent. After a temperature of about 120° C. is reached the first yielding of methanol occurs. After several hours the temperature is increased to 220–230° C. The re-esterification is concluded after 2 to 24 hours depending on the batch mixture selected.

The polyesters containing hydroxyl groups prepared in this manner are of a fluid to resinous consistency. The esterification products are colored yellow to light brown, and the polyesters made by re-esterification are nearly colorless. The molecular weight ranges from that of the simple ester prepared from 2 moles of trimethylhexanediol and 1 mole of terephthalic acid to as much as 4000. The prefered range is from 1500 to 2500. If the trimethylhexanediol is replaced by other diols and/or triols, the above maximum can be exceeded in some cases. The esters are soluble in solvents commonly used in varnish manufacture, such as butyl acetate, ethyl glycol acetate, methyl isobutyl ketone, xylene and naphthene hydrocarbons, to produce high concentrations. Viscosities desirable for practical purposes can be achieved with solutions of 60 to 70 percent by weight. Comparable polyesters on a basic of terephthalic acid, ethylene glycol, neopentyl glycol and hexanediol-(1,6), however, are vidtually insoluble.

The trimethylhexanediols named above can be used both individually and in mixtures for the preparation of the polyesters containing hydroxyl groups. Preferred is an approximately 1:1 mixture of the isomers as produced.

Examples of other diols and triols are: ethylene glycol, propylene glycols, butanediols, hexandiols differing from the above-mentioned trimethylhexanediols, octadecene-9,10-diol-(1,12), thiodiglycol, 2,2-dimethylpropanediol-(1,3), octadecanediol, 2-ethylhexanediol-(1,3), 2,4-dimethyl-2-propylheptanediol-(1,3), butenediol-(1,4) or butynediol-(1,4), diethyleneglycol, triethyleneglycol, glycerine, hexanetriol-(1,2,6) etc.

By reaction with aliphatic, cycloaliphatic and aromatic polyisocyanates, according to known methods, these polyesters containing hydroxyl groups produce coatings having good mechanical properties as well as excellent adhesion and hydrolysis resistance in only one coat on metals.

Suitable polyisocyanates in the meaning of the present invention are those which can be obtained by the oligomerization of diisocyanates, the reaction of such isocyanates with compounds having at least two active hydrogen atoms, and by reaction with water with the formation of biuret structures. Especially preferred are polyisocyanates on the basis of 3-isocyanatomethyl-3,5,5-trimethylcyclohexylisocyanate. Particularly suitable here is the trimerized form of 3-isocyanatomethyl-3,5,5-trimethylcyclohexylisocyanate as well as addition products formed with polyvalent alcohols enumerated above.

The reaction of the polyisocyanates with the polyesters containing hydroxyl groups is preformed under the usual conditions. After the addition of any fillers, dyes and pigments desired, the components are mixed at room temperature or slightly elevated temperature and applied to the products that are to be coated. The mixtures are then baked on to produce the actual coating. The baking temperature depends on the nature of the starting products; for example, it may range from 100 to 150° C., although higher or lower temperatures are possible. The systems are especially suitable for two-component bake-on varnishes in which good adherence and resistance to hot water are required in addition to the qualities usually required in polyurethane varnishes.

The products, as well as the process, of the invention are illustrated by the following examples, which are not, however, to be construed as unduly limitative thereof:

EXAMPLE 1: TWO-COMPONENT POLYURETHANE VARNISH (a) Polyester component 664 g. of refined terephthalic acid and 736 g. of 2,2,4- and 2,4,4-trimethylhexanediol-(1,6) in a 1:1 isomeric mixture were condensed by passing nitrogen through the mixture and slowly raising the temperature to 230° C. After 24 hours a polyester containing hydroxyl groups was obtained, having an OH number of 52 and an acid number of 2.5.

The hydroxyl-group-containing polyester was dissolved with ethylene glycol acetate to form a 60 wt.-percent solution. The viscosity of this solution proved to be good for manufacturing purposes.

(b) Isocyanate component 666 g. of 3-isocyanatomethyl-3,5,5-trimethylcyclohexylisocyanate (refered to hereinafter as isophorone diisocyanate for the sake of brevity) and 141.4 g. of trimethylolpropane were reacted at room temperature with the addition of 0.1 wt.-percent of di-n-butyltin dilaurate. The isophorone diisocyanate and catalyst were first placed in the vessel and over a period of 4 to 5 hours a solution of trimethylolpropane in ethyl glycol acetate was added drop by drop from a heated reservoir (approx. 50° C.). The amount of solvent was such that after the reaction components were completely combined the adduct solution was a 65%, solution by weight. The reaction medium was maintained by cooling at about 20° C.

The viscosity of this adduct solution was approximately 3000 centipoises, and the NCO content was 9.05%.

The alcohol component in the isophorone diisocyanate adduct can be replaced by other trivalent alcohols such as glycerine or hexanetriol-(1,2,6) without appreciable differences in comparison with the adduct solution described.

(c) Polyurethane varnish 100.0 g. of the polyester component solution (paragraph (a) above) and 27.8 g. of isocyanate adduct solution (paragraph (b)) were mixed together. After a preliminary reaction time of about 1 hour 200-micron thick coatings of this clear varnish were applied to 1 mm. steel plates with a dip-coating machine.

In a second batch, a varnish filled with 40% by weight of a $TiO_2$ pigment commercially obtainable under the trademark "Kronos RN 56" (rutile form) was applied in the above-described manner.

All of the test specimens were hardened out for 30 minutes at 150° C. The coating thickness after hardening amounted to 50–70 microns. The hardened varnish specimens were exposed to boiling water for 24 hours in one case and 7 days in another to test them for resistance to hydrolysis. After about 24 hours of drying at room temperature after such exposure the varnish films were measured again. If the varnish specimens are measured immediately after withdrawal from the boiling water the König hardness values will be about 10 to 20% lower than stated.

The very good qualities of this system as regards hardness, elasticity and adherence before and after the hydrolysis test are shown in the following table.

PROPERTIES OF THE VARNISH FILMS

| | After baking 30' at 150° C. | Resistance to boiling water | |
| --- | --- | --- | --- |
| | | 24 hours, 100° C. | 7 days, 100° C |
| (a) Clear varnish: | | | |
| Pendulum hardness (DIN 53,157) | 190 | 187 | 181 |
| Erichsen depression (DIN 53,156) | >10.5 | 11.1 | 10.5 |
| Grid section (Gitterschnitt DIN 53,151) | 0 | 0 | 0 |
| (b) Pigmented varnish (enamel): | | | |
| Pendulum hardness (DIN 53,157) | 166 | 173 | 145 |
| Erichsen depression (DIN 53,156) | >10.8 | 11.2 | 11.0 |
| Grid section (Gitterschnitt DIN 53,151) | 0 | 0 | 0 |

EXAMPLE 2: TWO-COMPONENT VARNISH (a) Polyester component

The solution of the polyester prepared from terephthalic acid and trimethylhexanediol-(1,6) described in Example 1 was selected.

(b) Isocyanate component

In this example a solution of oligomeric isocyanates on a basis of isophorone diisocyanate was used. The oligomer mixture having substantially isocyanurate structures can be prepared, by means of basic catalysts, preferably tertiary amines, from the corresponding isocyanate. A 70 wt.-percent solution in ethyl glycol acetate was used. The free isocyanate group content in this solution amounted to 6.2%.

(c) Polyurethane varnish

The ready-to-use varnish solution was formulated by mixing 100.0 g. of polyester solution with 39.6 g. of the isocyanate solution, and this was applied to steel plates as described in Example 1. The characteristics of the varnishes baked on for 30' at 150° C. and their resistance to hydrolysis can be seen in the following table:

| | After baking 30' at 150° C. | Resistance to hydrolysis | |
|---|---|---|---|
| | | 24 hours, 100° C. H₂O | 7 days, 100° C. H₂O |
| Pendulum hardness (DIN 53,157) | 198 | 182 | 185 |
| Erichsen depression (DIN 53,156) | 10.6 | 10.2 | 10.0 |
| Grid section (Gitterschnitt DIN 53,151) | 0 | 0 | 0 |

EXAMPLE 3: TWO-COMPONENT VARNISH (a) Polyhydroxyl component

The polyester prepared from terephthalic acid and trimethylhexanediol-(1,6) was used as the hydroxyl component.

(b) Isocyanate component

The adduct prepared from 3 moles of toluylene diisocyanate and 1 mole of trimethylol propane, which is available commercially as a 75% solution in ethyl acetate under the name Desmodur L, served as the isocyanate component in this example.

(c) Polyurethane varnish 100.0 g. of the polyester solution and 19.2 g. of Desmodur L were thoroughly mixed and applied to pieces of steel plate in the manner described under Example 1. The characteristics of the heat-hardened varnish films and their resistance to hydrolysis can be seen in the following table.

| | After baking 30' at 150° C. | Resistance to boiling water | |
|---|---|---|---|
| | | 24 hours | 7 days |
| Pendulum hardness (DIN 53,157) | 186 | 170 | 145 |
| Erichsen depression (DIN 53,156) | 12.2 | 12.0 | 12.3 |
| Grid section (Gitterschnitt DIN 53,151) | 0 | 0 | 0 |

EXAMPLE 4: TWO-COMPONENT VARNISH (a) Polyhydroxyl component 664 g. of terephthalic acid was condensed in the manner described in Example 1 with 704 g. of an isomer mixture of 2,2,4- and 2,4,4-trimethylhexanediol-(1,6) plus 26.8 g. of trimethylol propane. After condensation the polyester resin had an OH number of 46 and an acid number of 1.8. By dissolving the polyester to a 60 wt.-percent solution in ethyl glycol acetate a good viscosity for working purposes was achieved.

(b) Isocyanate component

The addition product of isophorone diisocyanate and trimethylol propane described in Example 1 was used.

(c) Polyurethane varnish 100.0 g. of the hydroxyl polyester solution and 23.8 g. of the isocyanate adduct solution were mixed together and test specimens were coated in the above-described manner and the coating was baked on.

PROPERTIES OF CLEAR VARNISH FILMS

| | After baking for 30' at 150° C. | Resistance to boiling water | |
|---|---|---|---|
| | | 24 hours | 7 days |
| Pendulum hardness (DIN 53,157) | 195 | 165 | 153 |
| Erichsen depression (DIN 53,156) | 10.7 | 10.4 | 10.6 |
| Grid section (Gitterschnitt DIN 53,151) | 0 | 0 | 0 |

EXAMPLE 5: TWO-COMPONENT VARNISH (a) Hydroxyl component 680 g. of terephthalic acid dimethyl ester and 701 g. of an isomer mixture of 2,2,4- and 2,4,4-trimethylhexanediol-(1,6) were reacted as described, with the addition of 0.05% of tetraisopropyltitanate. After removal of the methanol, a resin formed having an OH number of 75 and an acid number of less than 0.15. The 65 wt.-percent solution of this resin in ethyl glycol acetate was used in this example as the hydroxyl polyester component.

(b) Isocyanate component

The adduct of isophorone diisocyanate described in Example 1 was used.

(c) Two-component polyurethane varnish 100.0 g. of the polyester solution and 40.5 g. of the isocyanate adduct were thoroughly mixed and specimen plates were coated with this varnish solution in the described manner. The following table gives information on the very good mechanical characteristics and on the hydrolysis resistance of the varnish films produced by hardening at 150° C.

CHARACTERISTICS OF THE CLEAR VARNISH FILMS

| | After baking at 150° C. for 30 min. | Resistance to boiling water | |
|---|---|---|---|
| | | 24 hours | 7 days |
| Pendulum hardness (DIN 53,157) | 200 | 172 | 184 |
| Erichsen depression (DIN 53,156) | 12.5 | 11.6 | 11.9 |
| Grid section (Gitterschnitt DIN 53,151) | 0 | 0 | 0 |

It can be seen from the foregoing examples that the products made from polyesters composed exclusively of terephthalic acid and an isomer mixture of 2,2,4- and 2,4,4-trimethylhexanediol-(1,6) in a 1:1 ratio, combined with polyisocyanates based on isophorone diisocyanate, have the best hydrolysis resistance of all the products made in accordance with the invention. This hydrolysis resistance is better than that of products in which part of the mixture of the 2,2,4- and 2,4,4-trimethylhexanediol-(1,6) isomers in the polyester is replaced by other alcohols. This depends greatly, however, on the structure of the second alcoholic component selected, so that through careful selection and processing results can be achieved that may equal those obtained with the 1:1 mixture of the 2,2,4- and 2,4,4-trimethylhexanediol-(1,6) isomers.

It will be understood that the specification and examples are illustrative but not limitative of the present invention and that other embodiments within the spirit and scope of the invention will suggest themselves to those skilled in the art.

What is claimed is:

1. Hydrolysis-resistant polyurethane coating composition consisting essentially of the reaction product of
   (a) a polyisocyanate, or a mixture of polyisocyanates, with
   (b) hydroxyl-group-containing polyester having a molecular weight up to as much as 4000, said polyester being of
      (1) terephthalic acid and
      (2) a polyol, or a mixture of polyols, at least 50 mol-percent of which is 2,2,4- or 2,4,4-trimethylhexanediol-(1,6) and any balance of said polyol or mixture of polyols being selected from the group consisting of ethylene glycol, propylene glycol, butanediol, a hexanediol other than said 2,2,4- or 2,4,4-trimethylhexanediol-(1,6), octadecene - 9,10 - diol-(1,12), thiodiglycol, 2,2-dimethylpropanediol-(1,3), octadecanediol, 2-ethylhexanediol - (1,3), 2,4-dimethyl-2-propylheptanediol - (1,3), butenediol - (1,4), butynediol-(1,4), diethyleneglycol, triethyleneglycol, glycerine and hexanetriol-(1,2,6).

2. Hydrolysis-resistant polyurethane coating composition consisting essentially of the reaction product of
 (a) a polyisocyanate or a mixture of polyisocyanates with
 (b) hydroxyl-group-containing polyester having a molecular weight up to as much as 4000, said polyester being of
  (1) terephthalic acid and
  (2) a polyol, or a mixture of polyols, at least about 95 mole percent of which is 2,2,4- or 2,4,4-trimethylhexanediol-(1,6) or mixtures thereof.

3. Polyurethane composition as claimed in claim 2 wherein said polyisocyanate is substantially 3-isocyanatomethyl-3,5,5-trimethylcyclohexylisocyanate.

4. Composition as claimed in claim 2 wherein said polyisocyanate is substantially the trimerized form of 3-isocyanatomethyl-3,5,5-trimethylcyclohexylisocyanate.

5. Composition as claimed in claim 2 wherein said polyisocyanate comprises substantially adducts of 3-isocyanatomethyl - 3,5,5 - trimethylcyclohexylisocyanate and polyvalent alcohols.

6. Composition as claimed in claim 2 wherein the said polyol component (2) consists substantially entirely of 2,2,4- or 2,4,4 - trimethylhexanediol - (1,6), or mixtures thereof.

7. Composition as claimed in claim 2 wherein the balance of said polyols are triols.

8. Composition as claimed in claim 2 wherein the balance of said polyols are a mixture of other diols and triols.

References Cited
UNITED STATES PATENTS

| | | | |
|---|---|---|---|
| 3,296,211 | 1/1967 | Winkler et al. | 260—75 NK |
| 3,463,758 | 8/1969 | Stewart | 260—75 NK |
| 3,471,447 | 10/1969 | Kunde et al. | 260—75 NK |
| 3,496,144 | 2/1970 | Kunde et al. | 260—75 NK |
| 3,509,233 | 4/1970 | Muller et al. | 260—858 |
| 3,553,172 | 1/1971 | Thoma et al. | 260—75 NK |
| 3,583,943 | 6/1971 | Weber et al. | 260—75 NT |
| 3,664,979 | 5/1972 | Tanomura et al. | 260—75 NK |
| 3,674,746 | 7/1972 | Lohse et al. | 260—75 NP |
| 3,753,953 | 8/1973 | Leeuwerik et al. | 260—75 NK |

DONALD E. CZAJA, Primary Examiner

H. S. COCKERAM, Assistant Examiner

U.S. Cl. X.R.

260—75 NT, 77.5 NC